United States Patent [19]

Wilce

[11] 3,946,763
[45] Mar. 30, 1976

[54] ELONGATE UNITS SUITABLE FOR USE AS FURNACE SKIDS OR THE LIKE

[76] Inventor: Brian J. Wilce, Inner Court, Pewley Hill, Guildford, Surrey, England

[22] Filed: July 31, 1974

[21] Appl. No.: 493,429

[30] Foreign Application Priority Data
Aug. 16, 1973 United Kingdom............... 38727/73

[52] U.S. Cl. ................. 138/147; 138/149; 432/265
[51] Int. Cl.² .......................................... F16L 9/14
[58] Field of Search ....... 432/233, 265, 77, 85, 234; 266/33; 138/141, 143, 147, 149, 167

[56] References Cited
UNITED STATES PATENTS

| 928,233 | 7/1909 | Langford | 138/147 |
|---|---|---|---|
| 977,276 | 11/1910 | Crowley | 138/147 |
| 982,739 | 1/1911 | Moore | 138/147 |
| 3,789,886 | 2/1974 | Breitfuss | 138/147 |
| R18,785 | 4/1933 | Currie | 138/147 |

*Primary Examiner*—Houston S. Bell, Jr.
*Attorney, Agent, or Firm*—Sughrue, Rothwell, Mion, Zinn & Macpeak

[57] ABSTRACT

A structure which may be in the form of a furnace skid comprises a metal pipe encased with prefabricated sections each consisting of a backing member anchored to a refractory layer with an insulating layer in between.

7 Claims, 2 Drawing Figures

ELONGATE UNITS SUITABLE FOR USE AS FURNACE SKIDS OR THE LIKE

BACKGROUND OF THE INVENTION

In, for example, a slab reheating furnace, it is known to make provision for heating the slabs from above and from below by supporting them above the furnace floor upon an open platform constituted by transversely spaced longitudinally extending skids. The skids are supported by columns, termed "verticals" through the intermediary of transversely extending members, termed "crossovers". The skids, verticals and crossovers may each be in the form of a central steel support pipe through which water flows as a coolant, and which is encased in a cladding of refractory material. In the case of a skid, a continuous segmented rider bar is set into the refractory cladding and makes contact with the slabs.

An object of the invention is to provide an improved structure which may be used in a furnace and which, with minor changes in design, may be used as a skid, vertical, crossover or the like.

Accordingly, the support pipe is clad with a number of prefabricated sections, each of which comprises a backing plate from which a number of metal anchor elements extend outwardly. The anchors are embedded in a refractory layer and may pass through an intermediate fibrous layer having low thermal conductivity which isolates the backing member and the root portions of the anchors from the heat of the furnace. The backing member may be formed from a steel plate or steel mesh and may be coextensive with the refractory material. Preferably, however, the backing member extends beyond the refractory material in the circumferential sense so as to provide one or more projecting tongues which may overlap a similar tongue or tongues of other similar prefabricated sections and be secured thereto and/or to the pipe.

DESCRIPTION OF PREFERRED EMBODIMENTS

Figure 1:
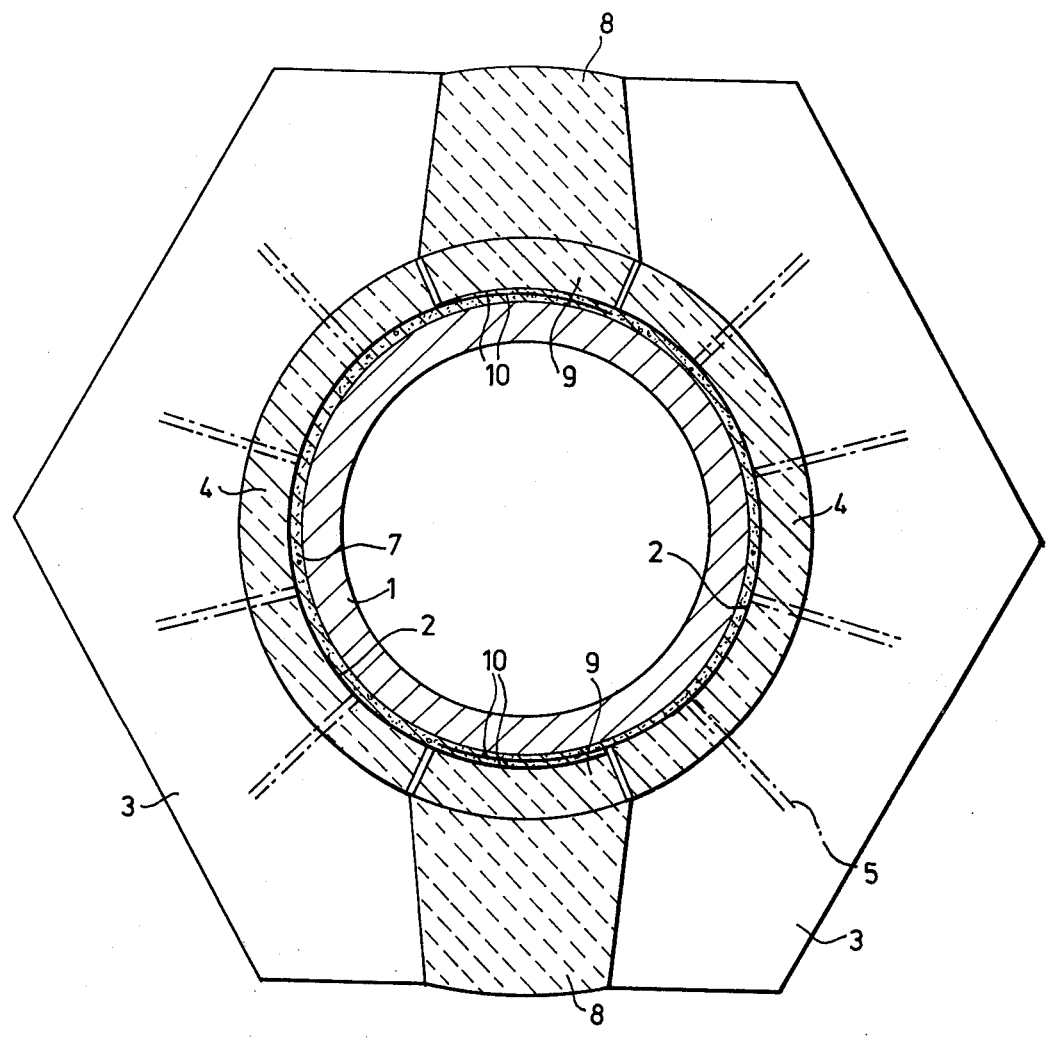
FIG. 1 is a section through a unit suitable for use as a vertical or crossover.

Referring to the drawings, each of the units depicted is based upon a central support pipe 1 through which, when the furnace is in use, water flows as a coolant. In each case the pipe is enclosed by a composite jacket made up from a number of prefabricated sections, each consisting of a metal plate or mesh backing member 2, a refractory insulation 3, and an intermediate layer of material 4 having a very low thermal conductivity. The thermal conductivity of the layer 4 may be in the range of 0.5 to 1.5 and that of the insulation 3 about 10, BTU's per square foot per °F per hour per inch. The materials 3 and 4 are secured to the backing member 2 by means of anchors 5 which are welded to and project radially from the backing member so as to pass through the layer 4 and be embedded in the insulation 3.

The backing member is formed from any suitable metal, such as mild steel or heat resisting stainless steel.

During fabrication of either unit, the prefabricated sections are applied to the pipe and secured in place by a layer 7 of suitable cement. The joints between the sections are then sealed with an in-situ refractory insulation 8 after insertion of a layer of material 9 corresponding to, and forming an extension of, the material 4.

Figure 2:
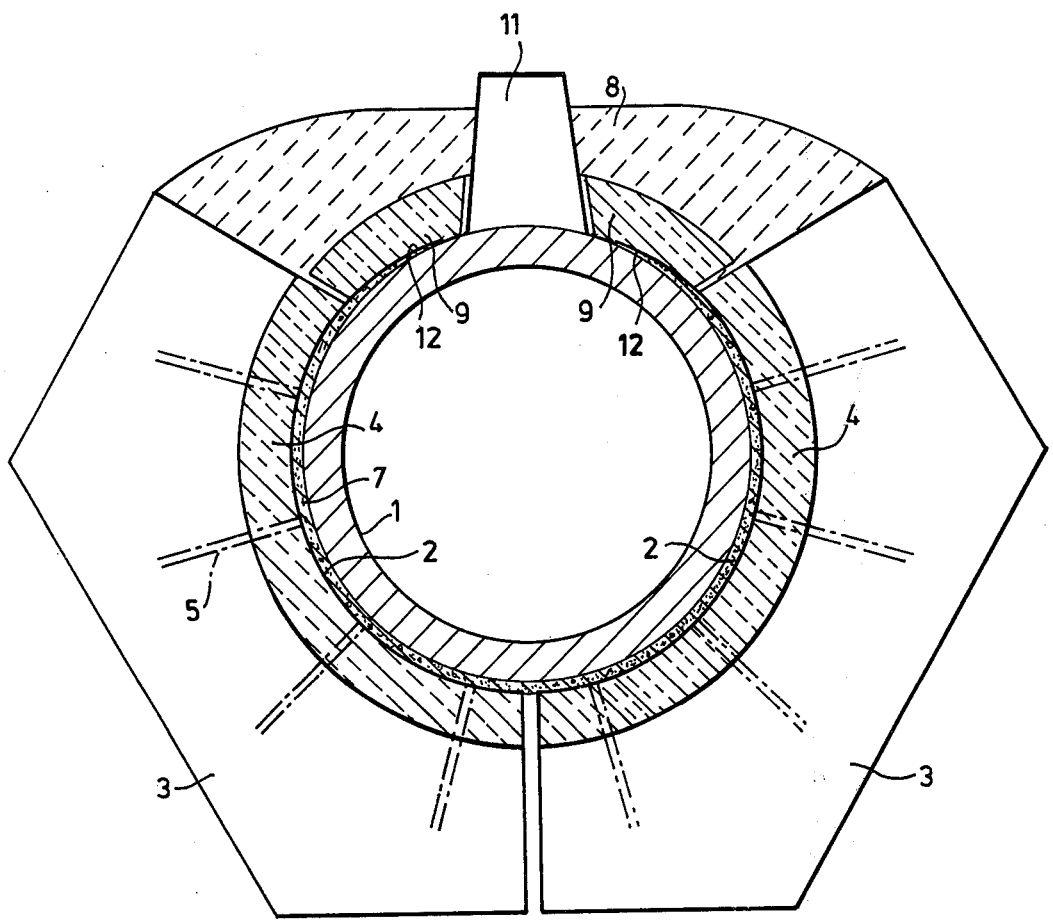
FIG. 2 is a cross-section through a unit suitable for use as a skid.

The two constructions depicted both have the features described above but differ in the following respects. In the case of the unit for use as a vertical or crossover, FIG. 1, the backing member of each section projects beyond the insulation to form tongues 10 which overlap, and may be secured to, similar tongues of the other section. In the embodiment shown in FIG. 2 which is intended for use as a skid, the presence of the rider bar 11 which bears directly upon, or may be integral with, the pipe renders this arrangement impracticable so that projecting tongues 12 terminate short of each other at the upper side of the unit. On the lower side, the sections are narrowly spaced from each other so that the backing member is here coextensive with the insulation.

By making use of the invention, several advantages are achieved compared with the known constructions. Firstly the layer 4 which may be in the form of a slab or fibrous blanket, may be employed to reduce heat losses, secondly, the anchors which reinforce the insulation are located in the zone wherein the minimum temperature prevails, and thirdly, the prefabricated sections can be secured to the pipe by means other than welding.

What I claim is:

1. For use in a furnace, a construction comprising a hollow metal pipe for a coolant and a cladding assembled from a plurality of sections, each of which comprises a metal backing member in contact with the pipe, a first layer of material of low thermal conductivity in the range of 0.5 to 1.5 BTU's per square foot per °F per hour per inch surrounding the backing member, and a second layer of refractory material surrounding the first layer, said section being held together by anchors which are secured to the backing member and extend outwardly from the backing member and are embedded in the second layer, to hold the first and second layers to the backing member.

2. The construction claimed in claim 1, wherein the backing member of each section has a tongue portion which projects beyond the first and second layers of that section into overlapping relationship with a tongue portion of another section.

3. The construction claimed in claim 2, wherein said tongue portions are secured together and to the pipe.

4. The construction claimed in claim 3, wherein said tongue portions project into a gap between adjacent sections and said gap is filled with a refractory material applied in-situ.

5. A construction for use in a furnace, comprising a hollow metal pipe and a cladding assembled from two prefabricated sections, each including a backing member embracing the pipe and a refractory layer radially outwardly of the backing member and held thereto by anchors which extend from the backing member and are embedded in the refractory layer, a layer of insulating material being disposed between the backing member and refractory layer, the backing members of the two sections having projecting tongue portions which extend into a gap between the two sections and are secured together, the space outwardly of the tongue portions being filled with a refractory material applied in-situ, the insulating material having a thermal conductivity of between 0.5 and 1.5 BTU's per square foot per °F per hour per inch.

6. The construction claimed in claim 5, wherein the backing member is formed from a steel mesh to which the anchors are welded.

7. The construction claimed in claim 6, hwerein the second layer has a thermal conductivity of about 10 BTU's per square foot per °F. per hour per inch.

* * * * *